US012733002B2

(12) United States Patent
Zhang et al.

(10) Patent No.: US 12,733,002 B2
(45) Date of Patent: Sep. 8, 2026

(54) RADIO NETWORK NODE, USER EQUIPMENT AND METHODS PERFORMED IN A WIRELESS COMMUNICATION NETWORK

(71) Applicant: Telefonaktiebolaget LM Ericsson (publ), Stockholm (SE)

(72) Inventors: Jianwei Zhang, Solna (SE); Yufei Blankenship, Kildeer, IL (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 527 days.

(21) Appl. No.: 18/042,629

(22) PCT Filed: Aug. 26, 2021

(86) PCT No.: PCT/SE2021/050831
§ 371 (c)(1),
(2) Date: Feb. 23, 2023

(87) PCT Pub. No.: WO2022/045955
PCT Pub. Date: Mar. 3, 2022

(65) Prior Publication Data

US 2023/0337240 A1 Oct. 19, 2023

Related U.S. Application Data

(60) Provisional application No. 63/071,385, filed on Aug. 28, 2020.

(51) Int. Cl.
*H04W 72/21* (2023.01)
*H04W 72/1268* (2023.01)
*H04W 72/566* (2023.01)

(52) U.S. Cl.
CPC ....... *H04W 72/21* (2023.01); *H04W 72/1268* (2013.01); *H04W 72/566* (2023.01)

(58) Field of Classification Search
None
See application file for complete search history.

(56) References Cited

U.S. PATENT DOCUMENTS

2020/0259896 A1 8/2020 Sachs et al.
2021/0092763 A1* 3/2021 Li ........................ H04L 1/1671
(Continued)

FOREIGN PATENT DOCUMENTS

WO 2020168223 A1 8/2020

OTHER PUBLICATIONS

International Search Report and Written Opinion dated Nov. 25, 2021 for International Application No. PCT/SE2021/050831 filed Aug. 26, 2021, consisting of 13-pages.
(Continued)

*Primary Examiner* — Srinivasa R Reddivalam
(74) *Attorney, Agent, or Firm* — Weisberg I.P. Law, P.A.

(57) ABSTRACT

A UE for handling communication in a wireless communication network, wherein PUCCH overlaps one or more PUSCH, on one or multiple carriers with at least one symbol. The UE is configured to multiplex one or more UCI to a radio network node, with a PUSCH or with resources of a configured grant, CG, based on whether or not a condition has been fulfilled. The condition relates to: a priority of a CG transmission relative a dynamic PUSCH transmission; a priority of a CG transmission relative other CG transmissions; allowance to carry any UCI in CG resources; presence of media access control, MAC, protocol data unit, PDU, for uplink, UL, transmission; if UCI is scheduled for transmission at a time as PUSCH, the UCI is multiplexed onto the PUSCH; CG size; failure rate of PDCCH; and/or whether dynamically scheduled uplink grant and CG are present.

12 Claims, 11 Drawing Sheets

(56) References Cited

U.S. PATENT DOCUMENTS

| | | | | |
|---|---|---|---|---|
| 2022/0159729 A1* | 5/2022 | Xiong | H04W 72/569 | |
| 2022/0217760 A1* | 7/2022 | Iyer | H04L 1/1887 | |
| 2023/0011162 A1* | 1/2023 | Li | H04W 72/1268 | |
| 2023/0199750 A1* | 6/2023 | He | H04L 5/0055 | 370/329 |
| 2025/0016779 A1* | 1/2025 | Huang | H04L 5/0094 | |

OTHER PUBLICATIONS

3GPP TS 38.321 V15.9.0; 3rd Generation Partnership Project; Technical Specification Group Radio Access Network; NR; Medium Access Control (MAC) protocol specification (Release 15); Jul. 2020, consisting of 78-pages.

3GPP TSG RAN WG1 Meeting #97 R1-1906753; Title: On resource conflicts between UL grants; Agenda Item: 7.2.6.7; Source: Nokia, Nokia Shanghai Bell; Document for: Discussion and Decision; Date and Location: May 13-17, 2019, Reno, Nevada, consisting of 3-pages.

3GPP TSG RAN WG1 #102-e R1-2005704; Title: Intra-UE multiplexing and prioritization; Agenda Item: 8.3.3; Source: CATT; Document for: Discussion and Decision; Date and Location: Aug. 17-28, 2020, e-Meeting, consisting of 3-pages.

* cited by examiner

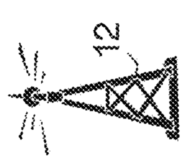
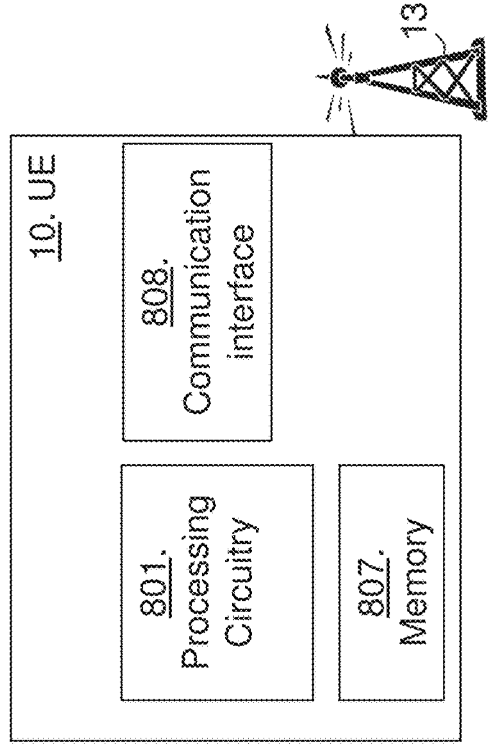
10. UE
801. Processing Circuitry
802. Receiving unit
803. Performing unit
807. Memory
Fig. 4
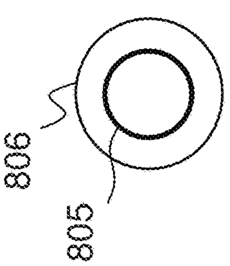

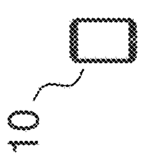
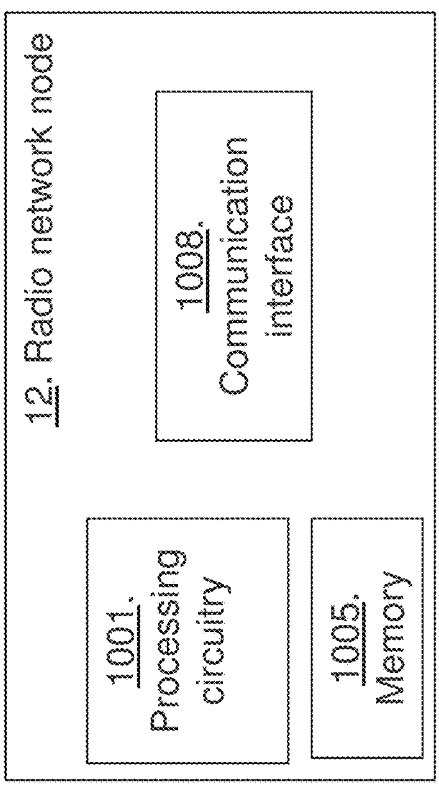
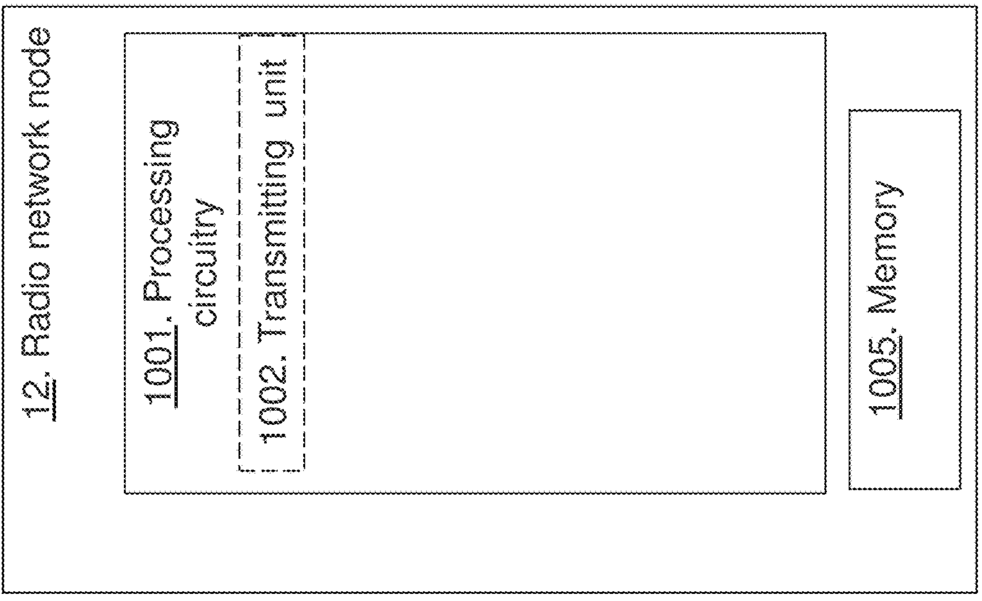
Fig. 5
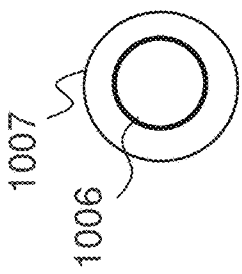

RADIO NETWORK NODE, USER EQUIPMENT AND METHODS PERFORMED IN A WIRELESS COMMUNICATION NETWORK

CROSS-REFERENCE TO RELATED APPLICATIONS

This application is a Submission Under 35 U.S.C. § 371 for U.S. National Stage Patent Application of International Application No.: PCT/SE2021/050831, filed Aug. 26, 2021 entitled "RADIO NETWORK NODE, USER EQUIPMENT AND METHODS PERFORMED IN A WIRELESS COMMUNICATION NETWORK," which claims priority to U.S. Provisional Application No. 63/071385, filed Aug. 28, 2020, entitled "RADIO NETWORK NODE, USER EQUIPMENT AND METHODS PERFORMED IN A WIRELESS COMMUNICATION NETWORK," the entireties of both of which are incorporated herein by reference.

TECHNICAL FIELD

Embodiments herein relate to a radio network node, a user equipment (UE) and methods performed therein regarding wireless communication. Furthermore, a computer program product and a computer-readable storage medium are also provided herein. Especially, embodiments herein relate to handling or enabling communication, e.g. handling uplink control information (UCI) from the UE to the radio network node, in a wireless communication network.

BACKGROUND

In a typical wireless communication network, UEs, also known as wireless communication devices, mobile stations, stations (STA) and/or wireless devices, communicate via a Radio access Network (RAN) to one or more core networks (CN). The RAN covers a geographical area which is divided into service areas or cell areas, with each service area or cell area being served by network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g., as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the $3^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies also known as new radio (NR), the use of very many transmit- and receive-antenna elements may be of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

NR uses Cyclic Prefix Orthogonal Frequency Division Multiplexing (CP-OFDM) in both DL, i.e., from a radio network node, such as a gNB, or base station, to a UE, and UL, i.e., from UE to the gNB. Discrete Fourier Transform (DFT) spread OFDM is also supported in the UL. In the time domain, NR downlink and uplink are organized into equally-sized subframes of 1 ms each. A subframe is further divided into multiple slots of equal duration. The slot length depends on subcarrier spacing. For subcarrier spacing of $\Delta f=15$ kHz, there is only one slot per subframe and each slot consists of 14 OFDM symbols.

Data scheduling in NR is typically in slot basis, an example is shown in FIG. 1*a* with a 14-symbol slot, where the first two symbols contain physical downlink control channel (PDCCH) and the rest contains physical shared data channel, either physical downlink shared channel (PDSCH) or physical uplink shared channel (PUSCH).

Different subcarrier spacing values are supported in NR. The supported subcarrier spacing values, also referred to as different numerologies, are given by $\Delta f=(15\times 2^{\mu})$ kHz where $\mu \in \{0, 1, 2, 3, 4\}$. $\Delta f=15$ kHz is the basic subcarrier spacing. The slot durations at different subcarrier spacings are given by $1/2^{\mu}$ ms.

In the frequency domain, a system bandwidth is divided into resource blocks (RB), each RB corresponds to 12 contiguous subcarriers. The RBs are numbered starting with 0 from one end of the system bandwidth. The basic NR physical time-frequency resource grid is illustrated in FIG. 1*b*, where only one RB within a 14-symbol slot is shown. One OFDM subcarrier during one OFDM symbol interval forms one resource element (RE).

Downlink transmissions are dynamically scheduled, i.e., in each slot the gNB transmits downlink control information (DCI) over PDCCH about which UE data is to be transmitted to the UE and which RBs in the current downlink slot the data is transmitted on. The UE data are carried on PDSCH.

There are three DCI formats defined for scheduling PDSCH in NR, i.e., DCI format 1_0 and DCI formats 1_1 and 1_2. DCI format 1_0 has a smaller size than DCI 1_1 and may be used when a UE is not fully connected to the network while DCI format 1_1, and 1_2 may be used for scheduling MIMO transmissions with multiple MIMO layers.

When receiving a PDSCH in the downlink from a serving gNB at slot n, a UE feeds back a Hybrid Automatic Repeat Request (HARQ) Acknowledgement (ACK) at slot n+k over a physical uplink control channel (PUCCH) resource in the uplink to the gNB if the PDSCH is decoded successfully, otherwise, the UE sends a HARQ nonacknowledgement (NACK) at slot n+k to the gNB to indicate that the PDSCH is not decoded successfully. If two transport blocks (TB) are carried by the PDSCH, then a HARQ ACK/NACK is reported for each TB.

For DCI format 1_0, k is indicated by a 3-bit PDSCH-to-HARQ-timing-indicator field. For DCI format 1_1, k is indicated either by a 3-bit PDSCH-to-HARQ-timing-indicator field, if present, or by higher layer through Radio Resource Control (RRC) signaling.

If code block group (CBG) transmission is configured, a HARQ ACK/NACK for each CBG in a TB is reported instead.

In case of carrier aggregation (CA) with multiple carriers and/or time division duplex (TDD) operation, multiple aggregated HARQ ACK/NACK bits need to be sent in a single PUCCH.

In NR, up to four PUCCH resource sets can be configured to a UE. A PUCCH resource set with pucch-ResourceSetId=0 may have up to 32 PUCCH resources while for PUCCH resource sets with pucch-ResourceSetId=1 to 3, each set may have up to 8 PUCCH resources. A UE determines the PUCCH resource set in a slot based on the number of aggregated Uplink Control Information (UCI) bits to be sent in the slot. The UCI bits consists of HARQ ACK/NACK, scheduling request (SR), and channel state information (CSI) bits.

For a PUCCH transmission with HARQ-ACK information, a UE determines a PUCCH resource after determining a PUCCH resource set. The PUCCH resource determination is based on a 3-bit PUCCH resource indicator (PRI) field in DCI format 1_0 or DCI format 1_1/1_2.

If more than one DCI format 1_0 or 1_1/1_2 are received in the case of CA and/or TDD, the PUCCH resource determination is based on a PRI field in the last DCI format 1_0 or DCI format 1_1 among the multiple received DCI format 1_0 or DCI format 1_1/1_2 that the UE detects. The multiple received DCI format 1_0 or DCI format 1_1/1_2 have a value of a PDSCH-to-HARQ_feedback timing indicator field indicating a same slot for the PUCCH transmission. For PUCCH resource determination, detected DCI formats are first indexed in an ascending order across serving cells indexes for a same PDCCH monitoring occasion and are then indexed in an ascending order across PDCCH monitoring occasion indexes.

Five PUCCH formats are defined in NR, i.e., PUCCH formats 0 to 4. UE transmits UCI in a PUCCH using PUCCH format 0 if

- the transmission is over 1 symbol or 2 symbols,
- the number of HARQ-ACK information bits with positive or negative SR (HARQ-ACK/SR bits) is 1 or 2

UE transmits UCI in a PUCCH using PUCCH format 1 if

- the transmission is over 4 or more symbols,
- the number of HARQ-ACK/SR bits is 1 or 2

UE transmits UCI in a PUCCH using PUCCH format 2 if

- the transmission is over 1 symbol or 2 symbols,
- the number of UCI bits is more than 2

UE transmits UCI in a PUCCH using PUCCH format 3 if

- the transmission is over 4 or more symbols,
- the number of UCI bits is more than 2,
- the PUCCH resource does not include an orthogonal cover code UE transmits UCI in a PUCCH using PUCCH format 4 if

- the transmission is over 4 or more symbols,
- the number of UCI bits is more than 2,
- the PUCCH resource includes an orthogonal cover code PUCCH formats 0 and 2 use one or two OFDM symbols while PUCCH formats 1,3 and 4 may span from 4 to 14 symbols. Thus, PUCCH format 0 and 2 are referred to as short PUCCH while PUCCH formats 1,3 and 4 are referred to as long PUCCH.

Uplink control information (UCI) is carried either by PUCCH or PUSCH. It contains one or several uplink control information i.e. DL acknowledgement such as ACK/NACK, channel quality indicator (CQI) or scheduling request (SR).

There may be a collision between physical resources for transmission of different UL control information, such as PUCCHs and/or PUSCH in a slot. In Rel-15 there are predefined rules on resolving the collision between their resources. The rules are in general based on multiplexing of UCI in a single PUCCH or a PUSCH resource. Timeline requirements for UCI multiplexing are defined that should be met for multiplexing to be expected by a UE. When a PUCCH carrying HARQ ACK overlaps with a PUSCH, one solution is to piggyback HARQ ACK on PUSCH, i.e. multiplex HARQ ACK with a beta factor on into PUSCH resources.

When there's PUCCH overlapping with multiple PUSCHs on one or multiple carriers with at least one symbol, following rules are defined in Rel-15 to decide which PUSCH shall be used to multiplex with UCI, the procedure is denoted as resolution of UCI multiplexed PUSCH (RUCIMP):

---

For UCI multiplexing, within a PUCCH group, on PUSCH, the following two steps are performed with step 1 first, then followed by step 2:

- Step 1: UCI in overlapped PUCCH transmissions is multiplexed into one PUCCH resource (resource Z). This step is done per PUCCH slot.
- Step 2: UCI, that doesn't include SR, in Z is multiplexed into one PUSCH, if Z overlaps with at least one PUSCH, following the priorities (sequentially from high to low) as listed below.

-continued

- First priority: PUSCH with A-CSI as long as it overlaps with Z
- Second priority: earliest PUSCH slot(s) based on the start of the slot(s)
- If there are still multiple PUSCHs overlap with Z in the earliest PUSCH slot(s), follow the following priorities (sequentially from high to low)
  - Third priority: Dynamic grant PUSCHs > configured grant PUSCHs PUSCHs configured by respective ConfiguredGrantConfig or semiPersistentOnPUSCH
  - Fourth priority: PUSCHs on serving cell with smaller serving cell index > PUSCHs on serving cell with larger serving cell index
  - Fifth priority: Earlier PUSCH transmission > later PUSCH transmission For the issue in the draft CR R1-1906302, the intended UE behaviour per specification is commonly understood as follows:

- For UCI multiplexing, within a PUCCH group, on PUSCH, the following two steps are performed with step 1 first, then followed by step 2:
  - Step 1: UCI in overlapped PUCCH transmissions is multiplexed into one PUCCH resource (resource Z). This step is done per PUCCH slot.
  - Step 2: UCI, that doesn't include SR, in Z is multiplexed into one PUSCH, if Z overlaps with at least one PUSCH, following the priorities (sequentially from high to low) as listed below
    - First priority: PUSCH with A-CSI as long as it overlaps with Z
    - Second priority: earliest PUSCH slot(s) based on the start of the slot(s)
    - If there are still multiple PUSCHs overlap with Z in the earliest PUSCH slot(s), follow the following priorities (sequentially from high to low)
      - Third priority: Dynamic grant PUSCHs>PUSCHs configured by respective ConfiguredGrantConfig or semi PersistentOnPUSCH
      - Fourth priority: PUSCHs on serving cell with smaller serving cell index>PUSCHs on serving cell with larger serving cell index
      - Fifth priority: Earlier PUSCH transmission>later PUSCH transmission Note:
The clrification applies to both cases with the same (except the second priority part) and different numerologies among PUCCH and PUSCHs.

The skipUplinkTxDynamic feature is a higher layer feature where the essential functionality provided by this feature is that a PUSCH transmission can be skipped due to lack of uplink data in the UE's data buffer, also referred to as UL-skipping. Hence, if a gNB due to different reasons such as inaccurate tracking of UE buffer status in case of sparse buffer status report granularity, performs over provisioning in PUSCH scheduling, the UE can skip a PUSCH grant in the absence of data when this feature is enabled. This in turn, would result in reducing the interference for other UEs in the same or neighbouring cells and improves the system performance. However, it has been realized that the current procedures specified in medium access control (MAC) and physical (PHY) specifications make implementation of this feature in NR too complicated for the benefits that it offers.

Prioritized and De-Prioritized PUSCH Transmission.

When the MAC entity is configured, with Ich-basedPrioritization, for each uplink grant which is not already a de-prioritized uplink grant:

1> if this uplink grant is addressed to CS-RNTI with new data indicator (NDI) = 1 or C-RNTI:
  2> if there is no overlapping PUSCH duration of a configured uplink grant, in the same bandwidth part (BWP) whose priority is higher than the priority of the uplink grant; and
  2> if there is no overlapping PUCCH resource with an SR transmission where the priority of the logical channel that triggered the SR is higher than the priority of the uplink grant:
    3> this uplink grant is a prioritized uplink grant;
    3> the other overlapping uplink grant(s), if any, is a de-prioritized uplink grant.
1> else if this uplink grant is a configured uplink grant:
  2> if there is no overlapping PUSCH duration of another configured uplink grant, in the same BWP, whose priority is higher than the priority of the uplink grant; and
  2> if there is no overlapping PUSCH duration of an uplink grant addressed to CS-RNTI with NDI = 1 or C-RNTI, in the same BWP, whose priority is higher than or equal to the priority of the uplink grant; and
  2> if there is no overlapping PUCCH resource with an SR transmission where the priority of the logical channel that triggered the SR is higher than the priority of the uplink grant:
    3> this uplink grant is a prioritized uplink grant;
    3> the other overlapping uplink grant(s), if any, is a de-prioritized uplink grant.

NOTE 6:
If there is overlapping PUSCH duration of at least two configured uplink grants whose priorities are equal, the prioritized uplink grant is determined by UE implementation.

Configured Grant can be configured with autonomous retransmission (autonomousReTx). The relevant 38.321 text in section 5.4.2.1 is copied below. When the Configured Grant (CG) is deprioritized and a MAC protocol data unit (PDU) has been obtained, a retransmission will be performed in next CG transmission occasion.

---

3> else if this uplink grant is a configured grant configured with autonomousReTx; and
3> if the previous configured uplink grant, in the bandwidth part (BWP), for this HARQ process was de-prioritized; and
3> if a MAC PDU had already been obtained for this HARQ process; and
3> if the uplink grant size matches with size of the obtained MAC PDU; and
3> if a transmission of the obtained MAC PDU has not been performed:
4> consider the MAC PDU has been obtained.

---

SUMMARY

As part of developing embodiments herein one or more following problems have been identified.

Problem 1: The RUCIMP procedure is very complicated and it challenges the UE and gNB processing capacity, especially for supporting features when a PUSCH transmission can be cancelled or skipped due to different reasons, for instance the collision between high and low priority data that the low priority PUSCH can be cancelled.

Problem 2: If the RUCIMP PUSCH is a configured grant (CG) PUSCH, the size of the CG PUSCH may be too small to carry the UCI, and thus only part of the UCI can be transmitted.

Problem 3: If the UE fails detecting PDCCH for the RUCIMP PUSCH on component carrier 0(CC-0), UE multiplexes UCI on another PUSCH on CC-1, gNB may fail decode the PUSCH on CC-1 as it doesn't know that the PDCCH is missed by the UE, the information carried in UCI will thus also be missed.

Furthermore, interaction between PHY and MAC for Multiplexing UCI on PUSCH is not clearly defined.

Thus, the performance of the wireless communication network may be limited or experienced as low when using the prior RUCIMP process.

An object of embodiments herein is to provide a mechanism that improves the performance in the wireless communication network.

According to an aspect the object is achieved by providing a method performed by UE for handling communication in a wireless communication network, wherein PUCCH overlaps one or more PUSCHs on one or multiple carriers with at least one symbol. The UE multiplexes one or more UCI with a PUSCH or with resources of a CG based on whether a condition has been fulfilled or not. The condition is relating to: a priority of a CG transmission relative a dynamic PUSCH transmission; a priority of a CG transmission relative other CG transmissions; presence of MAC PDU for UL transmission; allowance, e.g. not allowed, to carry any UCI in the CG resources; if UCI is scheduled for transmission at a time as PUSCH, the UCI is multiplexed onto the PUSCH; CG size; failure rate of PDCCH; and/or whether dynamically scheduled uplink grant and CG are present. Furthermore, a timeline for UE to multiplex UCI with PUSCH may be defined relating to transmission of confirmation or receiving of indication of deactivating or activating relating to CG transmission.

According to another aspect the object is achieved by providing a method performed by a radio network node for handling communication of a UE in a wireless communication network. The radio network node transmits a configuration to the UE comprising one or more conditions when PUSCH or with resources of a CG shall be used to multiplex with UCI. The one or more conditions may be relating to: a priority of a CG transmission relative a dynamic PUSCH transmission; a priority of a CG transmission relative other CG transmissions; presence of MAC PDU for UL transmission; allowance, e.g. not allowed, to carry any UCI in the CG resources; if UCI is scheduled for transmission at a time as PUSCH, the UCI is multiplexed onto the PUSCH; CG size; failure rate of PDCCH; and/or whether dynamically scheduled uplink grant and CG are present. It should be noted that a timeline for UE to multiplex UCI with PUSCH may be defined relating to transmission of confirmation or receiving of indication of deactivating or activating relating to CG transmission.

According to still another aspect the object is achieved by providing a UE and a radio network node configured to perform the methods herein.

Thus, it is herein provided a UE for handling communication in a wireless communication network, wherein PUCCH overlaps one or more PUSCH, on one or multiple carriers with at least one symbol. The UE is configured to multiplex one or more uplink control information, UCI, to a radio network node, with a PUSCH or with resources of a CG, based on whether a condition has been fulfilled or not. The condition is relating to: a priority of a CG transmission relative a dynamic PUSCH transmission; a priority of a CG transmission relative other CG transmissions; allowance to carry any UCI in CG resources; presence of MAC PDU for UL transmission; if UCI is scheduled for transmission at a time as PUSCH, the UCI is multiplexed onto the PUSCH; CG size; failure rate of PDCCH; and/or whether dynamically scheduled uplink grant and CG are present.

Thus, it is herein provided a radio network node for handling communication of a UE in a wireless communication network. The radio network node is configured to transmit a configuration to the UE comprising one or more conditions when PUSCH or with resources of a CG shall be used to multiplex with UCI. The condition is relating to: a priority of a CG transmission relative a dynamic PUSCH transmission; a priority of a CG transmission relative other CG transmissions; allowance to carry any UCI in CG resources; presence of MAC PDU for UL transmission; if UCI is scheduled for transmission at a time as PUSCH, the UCI is multiplexed onto the PUSCH; CG size; failure rate of PDCCH; and/or whether dynamically scheduled uplink grant and CG are present.

It is furthermore provided herein a computer program product comprising instructions, which, when executed on at least one processor, cause the at least one processor to carry out any of the methods above, as performed by the radio network node, or the UE, respectively. It is additionally provided herein a computer-readable storage medium, having stored thereon a computer program product comprising instructions which, when executed on at least one processor, cause the at least one processor to carry out the method according to any of the methods above, as performed by the radio network node, or the UE, respectively.

It is herein provided a more robust solution and determined behavior to support receiving of UCI multiplexed on PUSCH or with resources of a CG. This leads to an improved performance in the wireless communication network since decoding failure may be decreased, UCI may be multiplexed in CGs of a more appropriate size and the procedure is not complex.

BRIEF DESCRIPTION OF THE DRAWINGS

Embodiments will now be described in more detail in relation to the enclosed drawings, in which:

FIG. 4 is a block diagram depicting UEs according to embodiments herein;

FIG. 5 is a block diagram depicting radio network nodes according to embodiments herein;

DETAILED DESCRIPTION

Embodiments herein are described within the context of 3GPP NR radio technology (3GPP TS 38.300 V15.2.0 (2018-06)). It is understood, that the problems and solutions described herein are equally applicable to wireless access networks and user equipments (UEs) implementing other access technologies and standards. NR is used as an example technology where embodiments are suitable, and using NR in the description therefore is particularly useful for understanding the problem and solutions solving the problem. In particular, embodiments are applicable also to 3GPP LTE, or 3GPP LTE and NR integration, also denoted as non-standalone NR.

Figures 1A, 1B:
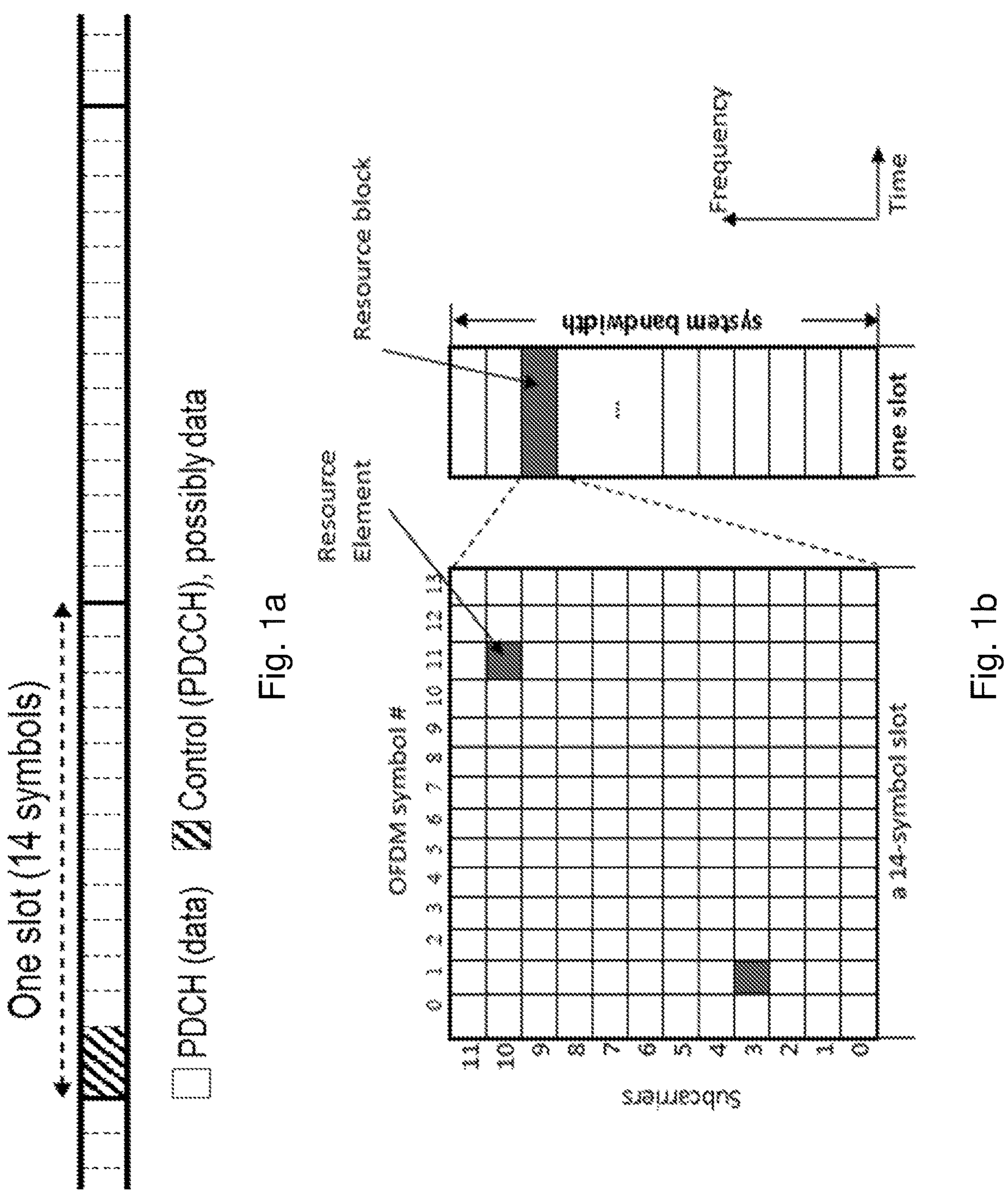
FIG. 1*a* is a schematic view depicting NR time-domain structure with 15 kHz subcarrier spacing.
FIG. 1*b* is a schematic view illustrating NR physical resource grid.
Figure 2:
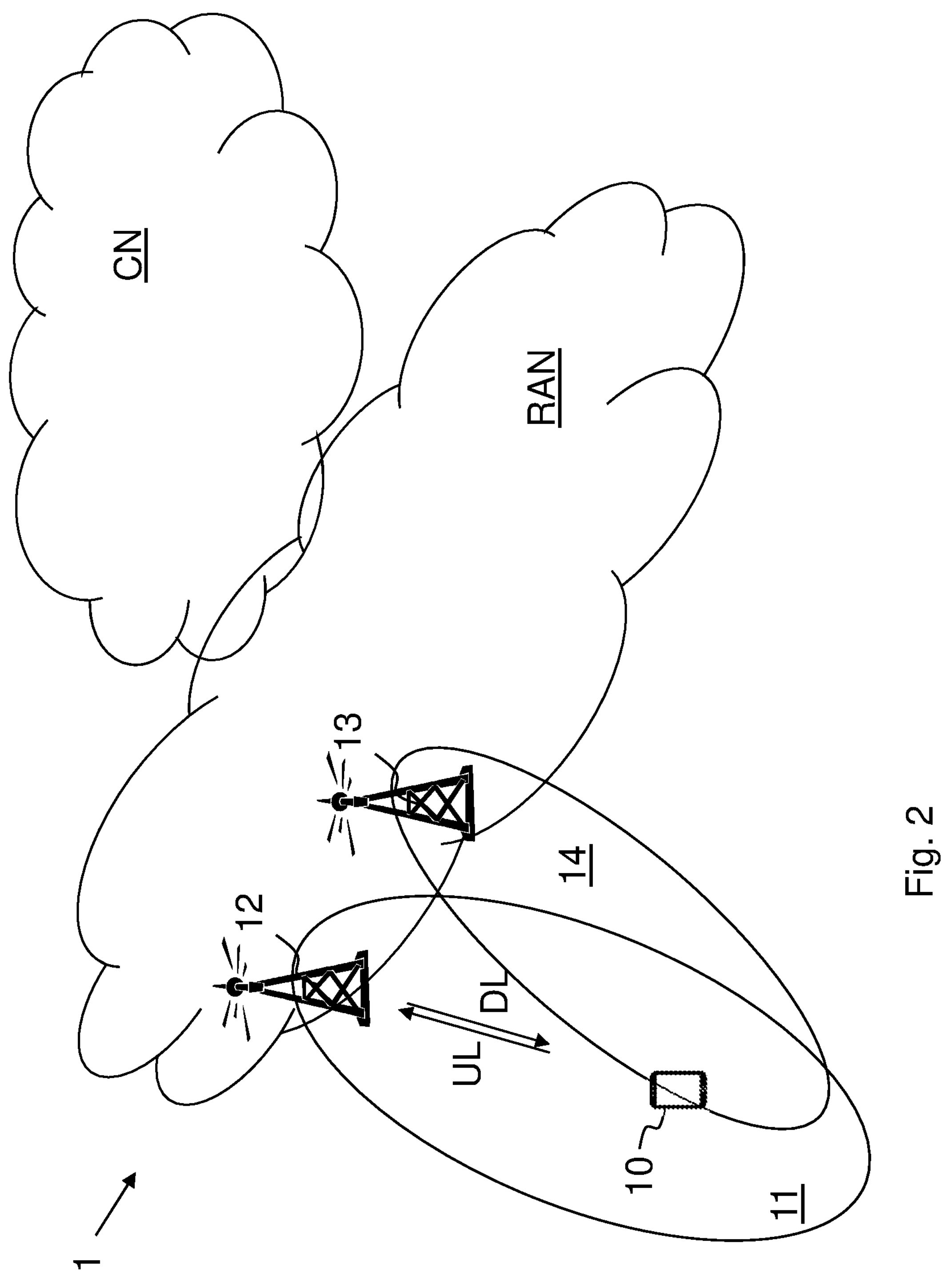
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies, such as Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a UE 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12 providing radio coverage over a geographical area, a first service area 11, of a radio access technology (RAT), such as LTE, Wi-Fi, WiMAX or similar. The first radio network node 12 may be denoted as the radio network node 12 and may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a gNodeB (gNB), a base transceiver station, a radio remote unit, an Access Point Base Station, a base station router, a transmission arrangement of a radio base station, a stand-alone access point or any other network unit or node capable of communicating with a UE within the area served by the radio network node 12 depending e.g. on the radio access technology and terminology used. The radio network node 12 may alternatively or additionally be a controller node or a packet processing node such as a radio controller node or similar. The radio network node 12 may be referred to as a serving network node wherein the first cell may be referred to as a serving cell or primary cell, and the serving network node communicates with the UE 10 in form of DL transmissions to the UE 10 and UL transmissions from the UE 10.

The wireless communication network 1 comprises a second radio network node 13 providing radio coverage over a geographical area, a second service area 14, of a radio access technology (RAT), such as LTE, Wi-Fi, WiMAX or similar. The radio network node 13 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a gNodeB (gNB), a base transceiver station, a radio remote unit, an Access Point Base Station, a base station router, a transmission arrangement of a radio base station, a stand-alone access point or any other network unit or node capable of communicating with a UE within the area served by the second radio network node 13 depending e.g. on the radio access technology and terminology used. The second radio network node 13 may alternatively or additionally be a controller node or a packet processing node such as a radio controller node or similar. The second radio network node 13 may be referred to as a secondary serving network node wherein the second service area may be referred to as a secondary serving cell or secondary cell, and the serving network node communicates with the UE 10 in form of DL transmissions to the UE 10 and UL transmissions from the UE 10.

It should be noted that a service area may be denoted as cell, beam, beam group or similar to define an area of radio coverage.

Embodiments herein enable the UE 10 for communicating in the wireless communication network 1 wherein PUCCH overlaps one or more PUSCHs on one or more carriers with at least one symbol. The UE 10 multiplexes one or more UCI with a PUSCH or with resources of a CG based on whether a condition has been fulfilled or not. The condition is relating to at least one of the following: a priority of a CG transmission relative a dynamic PUSCH transmission; a priority of a CG transmission relative other CG transmissions; presence of MAC PDU for UL transmission; allowance, e.g. not allowed, to carry any UCI in the CG resources; if UCI is scheduled for transmission at a time as PUSCH, the UCI is multiplexed onto the PUSCH; CG size; failure rate of PDCCH; and/or whether dynamically scheduled uplink grant and CG are present. Additionally or alternatively, a timeline for the UE 10 to multiplex UCI with PUSCH is defined relating to transmission of confirmation or receiving of indication of deactivating or activating relating to CG transmission.

Embodiments herein propose e.g.:

1. The resolution priority or behavior of Configured grant (CG) transmission when multiplexing with UCI is configurable when applying resolution of UCI multiplexed PUSCH (RUCIMP).
   a. A CG may be configured to have higher priority than dynamic PUSCH to carry UCI over same or multiple component carriers (CC).
   b. A CG may be configured to have higher priority than other CGs over same or multiple CCs.
   c. A CG may be configured to have lower priority than other CGs over same or multiple CCs.
   d. A CG may be configured to not carry UCI.
      a. the CG transmission may be skipped when the CG PUSCH colliding with PUCCH, PUCCH may be transmitted, or UCI can be skipped.
2. Interaction between PHY and MAC for Multiplexing UCI on PUSCH
3. Time reference and additional time to apply the UCI multiplexing with CG.

It is herein provided a more robust solution and determined behavior to support receiving of UCI and UCI multiplexed on PUSCH.

a. For 1*c* and 1*d*: In case CG size is too small to carry large UCI, the CG may be skipped or assigned with lower resolution priority, UCI with more important information will be received on PUCCH or larger CG.
b. For 1*a* and 1*b*: In case, in downlink, PDCCH is suffering high failure rate, dynamic PUSCH become unreliable. The radio network node 12 can rely on CG to receive UCI.

Figure 3A:
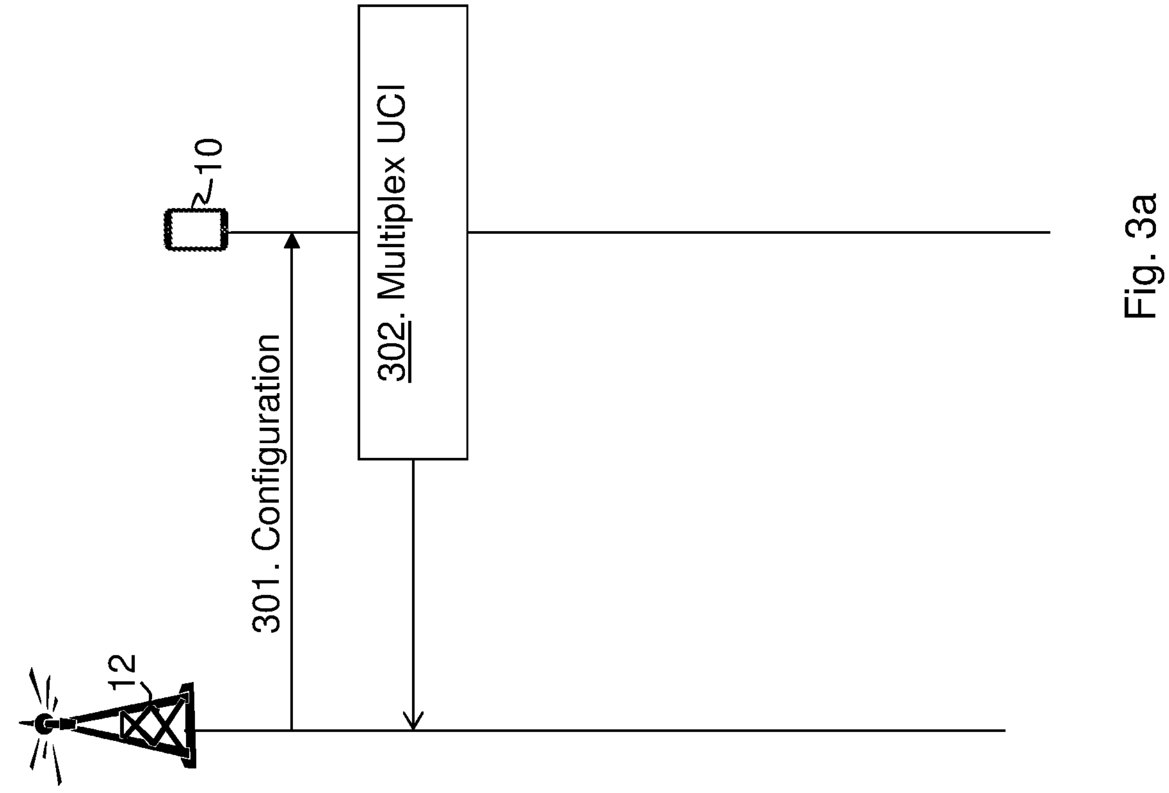
FIG. 3*a* is a combined signalling scheme and flowchart according to embodiments herein.

FIG. 3*a* is a combined flowchart and signalling scheme according to embodiments herein. The actions may be performed in any suitable order.

Action 301. The radio network node 12 (or the second radio network node 13) transmits the configuration for the UE to handle UCI when PUCCH overlaps one or more PUSCHs on one or more carriers with at least one symbol.

Action 302. The UE 10 handles UCI as configured. E.g. the UE multiplexes one or more UCI with a PUSCH or with resources of a CG based on whether a condition has been fulfilled or not. The condition is relating to one or more of the following: a priority of a CG transmission relative a dynamic PUSCH transmission; a priority of a CG transmission relative other CG transmissions; presence of MAC PDU for UL transmission; not allowed to carry any UCI in the CG resources; if UCI is scheduled for transmission at a time as PUSCH, the UCI is multiplexed onto the PUSCH; CG size; failure rate of PDCCH; and/or whether dynamically scheduled uplink grant and CG are present. Additionally or alternatively, a timeline for UE to multiplex UCI with PUSCH is defined relating to transmission of confirmation or receiving of indication of deactivating or activating relating to CG transmission.

Figure 3B:
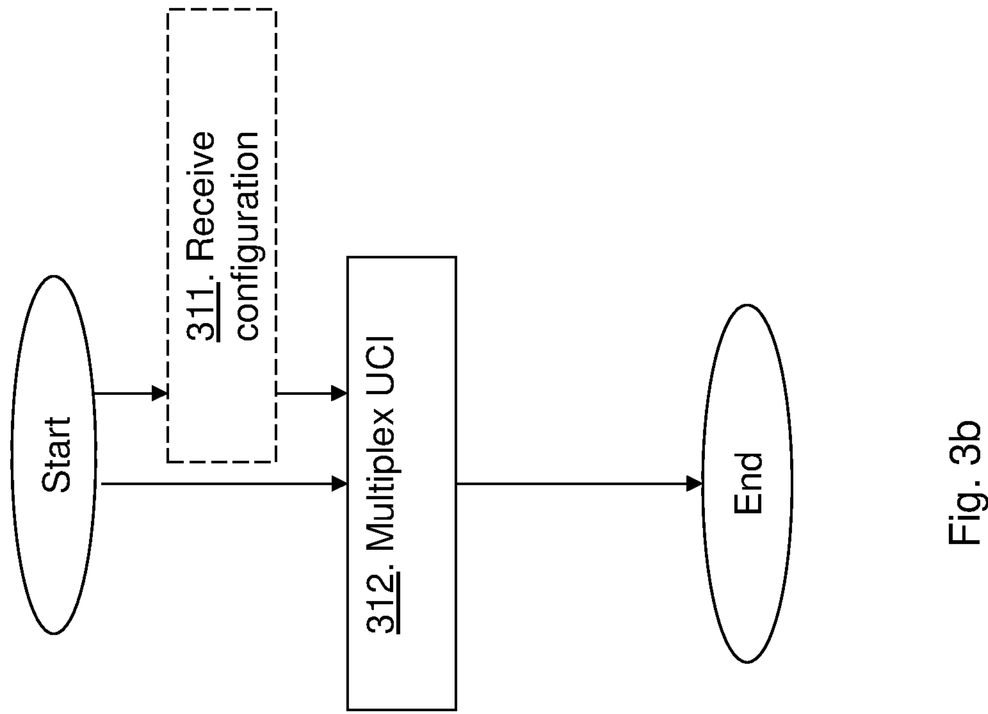
FIG. 3*b* is a flowchart depicting a method performed by a UE according to embodiments herein.

The method actions performed by the UE 10 for handling communication or UCI in the wireless communication network 1 according to embodiments will now be described with reference to a flowchart depicted in FIG. 3*b*. The PUCCH overlaps one or more PUSCH on one or multiple carriers with at least one symbol. Actions performed in some embodiments are marked with dashed boxes.

Action 311. The UE 10 may receive a configuration from the radio network node 12 comprising the one or more conditions.

Action 312. The UE 10 multiplexes, to the radio network node 12, one or more UCI with the PUSCH or with resources of the CG, based on whether the condition has been fulfilled or not. The condition is relating to:

a priority of a CG transmission relative a dynamic PUSCH transmission; a priority
of a CG transmission relative other CG transmissions; allowance to carry any UCI
in CG resources; presence of MAC PDU for UL transmission; if UCI is scheduled for transmission at a time as PUSCH, the UCI is multiplexed onto the PUSCH; CG size; failure rate of PDCCH; and/or whether dynamically scheduled uplink grant and CG are present.

The UE 10 may multiplex the one or more UCIs with the PUSCH or with resources of the CG, by using a timeline relating to transmission of confirmation or receiving of indication of deactivating or activating relating to CG transmission.

Figure 3C:
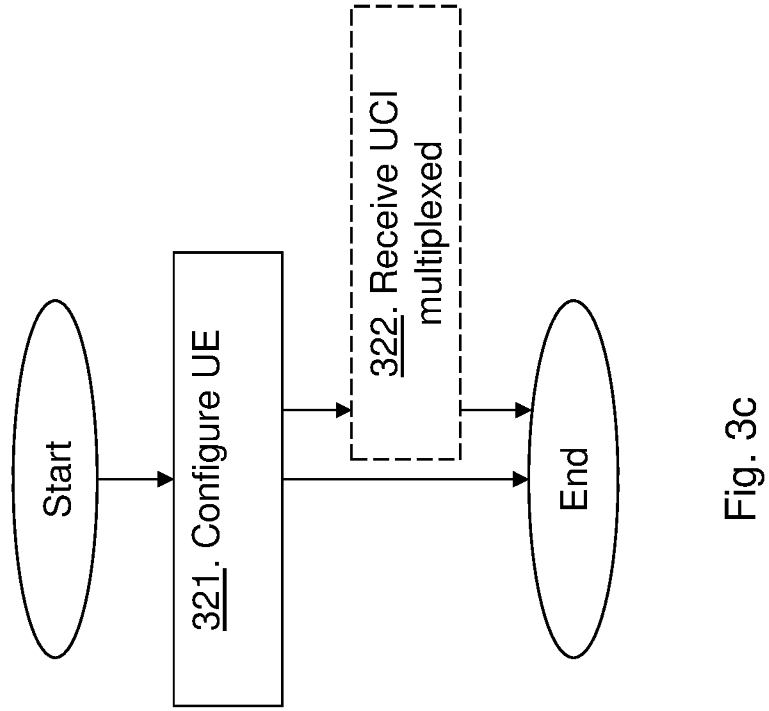
FIG. 3*c* is a flowchart depicting a method performed by a radio network node according to embodiments herein.

The method actions performed by the radio network node 12 for handling communication of the UE or UCI in the wireless communication network 1 according to embodiments will now be described with reference to a flowchart depicted in FIG. 3*c*. The PUCCH overlaps one or more PUSCH on one or multiple carriers with at least one symbol. The actions do not have to be taken in the order stated below, but may be taken in any suitable order. Actions performed in some embodiments are marked with dashed boxes.

Action 321. The radio network node 12 transmits a configuration to the UE comprising one or more conditions when PUSCH or with resources of the CG, shall be used to multiplex with UCI, wherein the condition is relating to:

a priority of a CG transmission relative a dynamic PUSCH transmission; a priority of a CG transmission relative other CG transmissions; allowance to carry any UCI in CG resources; presence of MAC PDU for UL transmission; if UCI is scheduled for transmission at a time as PUSCH, the UCI is multiplexed onto the PUSCH; CG size; failure rate of PDCCH; and/or whether dynamically scheduled uplink grant and CG are present.

Action 322. The radio network node may receive one or more UCI multiplexed with a PUSCH or with resources of the CG, and using a time reference and an additional time. For example, the radio network node 12 may thus add the additional time to decode the PUSCH and the radio network node 12 may add one or more of the following: gNB PUSCH decoding time as the additional time; another example is to even include PUSCH retransmission time as the additional time; a third example is to add time from a selected time range as the additional time. The time reference, selection of additional time, can be configured from higher layer.

Hence, according to embodiments herein the UE 10 may be configured to treat UL transmissions as described herein.

Embodiments herein provide a configurable resolution priority and behavior for CG with overlapping PUCCH. Thus, the resolution priority or behavior of a CG transmission when multiplexing with UCI may be configurable, using the condition, when applying RUCIMP, despite of the presence of MAC PDU for the CG.

- A CG-X can be configured to have higher priority than dynamic PUSCHes and other CGs to carry UCI over same or multiple CCs regardless presence of MAC PDU for the CG X transmission. When the CG transmission occasion overlaps with other PUSCHs and PUCCH, the UCI is always multiplexed on CG-X; CG-X transmission is prioritized over other PUSCH transmissions regardless of the presence of MAC PDU. This is an example of the condition being related to priority of a CG transmission relative a dynamic PUSCH transmission.
- A CG X can be configured to have higher priority than other CGs over same or multiple CCs to carry UCI. If overlapping transmission occasions of the CG happens, the UCI will be multiplexed on the CG X with higher multiplexing priority regardless of the presence of MAC PDU. This is an example of the condition being related to priority of a CG transmission relative other CG transmissions.
- A CG can be configured to have lower priority than other CGs over same or multiple CCs for UCI multiplexing. This is an example of the condition being related to priority of a CG transmission relative other CG transmissions.
- A CG can be configured to NOT carry any UCI. In another words, the CG is excluded from resolution procedure to carry UCI. This is an example of the condition being related to allowance to carry any UCI in CG resources.
  - One alternative, the CG transmission is skipped/deprioritized when the CG PUSCH colliding with PUCCH, UCI to be carried on PUCCH is prioritized, UCI will be transmitted on PUCCH or other PUSCHs. If the MAC PDU for this CG has been delivered, then the CG-PUSCH is autonomously retransmitted in the next CG occasion. The associated RRC parameter indicated to the UE to always drop the CG when overlapping with PUCCH can be configured in PUSCH-Config, or ConfiguredGrant-Config, or by reusing existing parameter autonomousReTx-r16 in configuredGrantConfig. This is an example of the condition being related to presence of MAC PDU for UL transmission.
  - Another alternative, the UCI is deprioritized when CG PUSCH colliding with PUCCH; CG PUSCH will be prioritized and transmitted.

The indication of resolution priority, being an example of the condition, can be configured in ConfiguredGrantConfig or PUSCH-Config.

In one embodiment, the RRC parameter phy-PriorityIndex-r16 configured in ConfiguredGrantConfig, and/or priorityIndicator configured in PUSCH-Config, can be associated with multiplexing resolution procedure, i.e. UCI multiplexing, regardless of the presence of MAC PDU for CG transmission occasion.

The condition may be related to the CG size. For example, in case CG size is too small to carry large UCI, the CG may be skipped or assigned with lower resolution priority, UCI with more important information will be received on PUCCH or larger CG.

The condition may be related to failure rate of the PDCCH. For example, in case PDCCH is suffering high failure rate, dynamic PUSCH become unreliable. The radio network node may then rely on CG to receive multiplexed UCI.

Interaction Between PHY and MAC for Multiplexing UCI on PUSCH.

In Rel-15 and Rel-16 NR carrier aggregation, there is no support of simultaneous PUCCH and PUSCH transmission over two carriers, for example, towards the first and second radio network nodes. Thus, if UCI is scheduled for transmission at the time as PUSCH, the UCI may be multiplexed onto the PUSCH. Thus, the condition may be related to if the UCI is scheduled for transmission at a time as PUSCH, the UCI is multiplexed onto the PUSCH. When there are multiple carriers with PUSCH, the PUSCH on the carrier of lowest index may be selected for UCI multiplexing.

The UCI multiplexing procedure may need to additionally take into account:

- At the PHY layer,
  - UCI and PUSCH, each may have two (or more) physical layer priority levels.
  - the PUSCH can be cancelled or dropped for various reasons, including due to inter-UE cancellation and/or intra-UE cancellation.
  - Timeline requirements may need to be satisfied for various physical layer procedure, including intra-UE multiplexing/prioritization and inter-UE cancellation.
- At the MAC layer,
  - for both dynamically scheduled PUSCH and CG PUSCH, the MAC may or may not generate a TB for it.

In terms of interaction between MAC and PHY, there are two options:

- Alternative A. MAC procedure for UL grant is handled first, without regard to physical layer procedure such as multiplexing and prioritization. As an outcome of the MAC procedure, some PUSCH, denoted $PUSCH_{withoutTB}$, does not receive a TB, while others, denoted $PUSCH_{withTB}$, receive a TB from MAC. Subsequently, at the PHY layer, the PHY layer procedure proceeds assuming absence of $PUSCH_{withTB}$, and only considers $PUSCH_{withTB}$.
- Alternative B. Physical layer procedure such as multiplexing and prioritization are checked with a test-run, and these procedures included in the test run are denoted P_set1. Checking of P_set1 gives an indicator for each UL grant, indicating if the UL grant is a surviving grant or discarded grant. For the surviving grants, MAC procedure is applied, and may (or may not) generate a TB for each of the surviving grants. MAC procedure is not applied for the discarded grants, i.e., no TB is generated for them. Thus, PUSCH transmission is only carried out for uplink grant that both (a) is a surviving grant; and (b) contains a TB generated by MAC. The TBs generated for the surviving grants are then passed from MAC to PHY, and the full set of PHY procedure are applied to prepare actual uplink transmission.

a. P_set1 may include a selected few of physical layer procedure, but not all physical layer procedures. In a typical case, P_set1 may include, for example, {semi-static TDD slot pattern, SFI for dynamic TDD slot pattern, DCI detection, time and frequency domain resource determination of the UL grant, intra-UE multiplexing/prioritization procedure with multiple physical layer priority levels (including associated timeline check)}; but P_set1 does not include, for example, {inter-UE cancellation (including associated timeline check), power control}.

b. For the surviving grants, it can be further divided into two types: mandatory surviving grants and optional surviving grants. For mandatory surviving grants, MAC layer is required to generate a TB for it, including a padding TB if no buffer data is available. For optional surviving grants, the MAC layer may or may not generate a TB, depending on factors such as logical channel buffer status, MAC layer prioritization, etc.

Alternative A is a procedure between MAC and PHY.

Alternative B is an advanced procedure to handle the tight interaction between MAC and PHY due to, e.g., the intra-UE prioritization that can happen at both MAC and PHY for Ultra-reliable low-latency communication (URLLC)/Industrial Internet of Things (IIoT) use case.

For dynamically scheduled uplink grant and CG grant, slightly different procedures may be applied. Thus, the condition may be related to whether dynamically scheduled uplink grant and CG are present. For example, for dynamic UL grant, all surviving grants are considered mandatory surviving grants by default, unless some special condition makes the dynamic UL grant an optional surviving grant. One example of the special condition is when 'uplink skipping' is configured by radio network node 12.

whereas for CG, surviving grants are considered optional surviving grants by default unless some special condition makes it a mandatory surviving grant. On example of the special condition is, the CG PUSCH is designated to carry UCI via the UCI-PUSCH multiplexing procedure.

Multiplexing Timeline Reference for CG.

To perform multiplexing UCI on PUSCH, a certain timeline may have to be defined to ensure sufficient time for the UE 10 to multiplex UCI with PUSCH.

For type 2 configured grant, the time when the UE 10 sends confirmation in MAC CE, which is also the first transmission occasion for CG, to acknowledge the receiving of valid PDCCH carrying Activation or Deactivation of the CG can be used as reference time for applying the timeline.

Another alternative is to use the time, when activating/deactivating DCI for the CG is received in UE, as reference time.

Relying only on reference time may cause problem for the radio network node 12 to find out on which PUSCH the UCI is being multiplexed on. The reference time can be inaccurate estimated for the reason that: the UE 10 may miss detect the activation PDCCH; the radio network node 12 may fail decode the PUSCH carries the acknowledging MACCE. Therefore, additional time can be added to the reference time in order to cover the possible error cases. One example is to add PUSCH decoding time at the radio network node 12; another example is to even include PUSCH retransmission time; a third example is to add time from a selected time range. The time reference, selection of additional time, can be configured from higher layer.

Note that in a general scenario the term "radio network node" can be substituted with "transmission point". Distinction between the transmission points (TPs) may typically be based on reference signals (RS) or different synchronization signals transmitted. Several TPs may be logically connected to the same radio network node but if they are geographically separated, or are pointing in different propagation directions, the TPs may be subject to the same mobility issues as different radio network nodes. In subsequent sections, the terms "radio network node" and "TP" can be thought of as interchangeable.

FIG. 4 is a block diagram depicting the UE 10, in two embodiments, for handling communication of the UE 10, e.g. handling UCI, in the wireless communication network 1 according to embodiments herein. The PUCCH overlaps one or more PUSCH on one or multiple carriers with at least one symbol.

The UE 10 may comprise processing circuitry 801, e.g. one or more processors, configured to perform the methods herein. The UE 10 may comprise a receiving unit 802, e.g. a receiver or a transceiver.

The UE 10, the processing circuitry 801, and/or the receiving unit 802 is configured to receive the configuration from the radio network node comprising the one or more conditions.

The UE 10 may comprise a performing unit 803. The UE 10, the processing circuitry 801, and/or the performing unit 803 is configured to multiplex to the radio network node one or more UCIs with a PUSCH or with resources of a CG based on whether a condition has been fulfilled or not. The condition is relating to:

a priority of a CG transmission relative a dynamic PUSCH transmission; a priority of a CG transmission relative other CG transmissions; allowance to carry any UCI in CG resources; presence of MAC PDU for UL transmission; if UCI is scheduled for transmission at a time as PUSCH, the UCI is multiplexed onto the PUSCH; CG size; failure rate of PDCCH; and/or whether dynamically scheduled uplink grant and CG are present.

The UE 10, the processing circuitry 801, and/or the performing unit 803 may be configured to multiplex the one or more UCI with the PUSCH or with resources of the CG, by using the timeline relating to transmission of confirmation or receiving of indication of deactivating or activating relating to CG transmission. Thus, a timeline for the UE 10 to multiplex UCI with PUSCH may be defined relating to transmission of confirmation or receiving of indication of deactivating or activating relating to CG transmission.

The UE 10 further comprises a memory 807. The memory comprises one or more units to be used to store data on, such as indications, CGs, dynamic scheduled grants, priorities, RSs, strengths or qualities, UL grants, indications, requests, commands, timers, applications to perform the methods disclosed herein when being executed, and similar. Thus, the UE may comprise the processing circuitry and the memory, said memory comprising instructions executable by said processing circuitry whereby said UE is operative to perform the methods herein. The UE 10 comprises a communication interface 808 comprising one or more antennas.

The methods according to the embodiments described herein for the UE 10 are respectively implemented by means of e.g. a computer program product 805 or a computer program, comprising instructions, i.e., software code portions, which, when executed on at least one processor, cause the at least one processor to carry out the actions described herein, as performed by the UE 10. The computer program product 805 may be stored on a computer-readable storage medium 806, e.g. a universal serial bus (USB) stick, a disc or similar. The computer-readable storage medium 806, having stored thereon the computer program product, may comprise the instructions which, when executed on at least one processor, cause the at least one processor to carry out the actions described herein, as performed by the UE 10. In some embodiments, the computer-readable storage medium may be a non-transitory or a transitory computer-readable storage medium.

FIG. 5 is a block diagram depicting the radio network node 12 for handling communication of the UE, e.g., facilitating configuration, in the wireless communication network 1 according to embodiments herein.

The radio network node 12 may comprise processing circuitry 1001, e.g. one or more processors, configured to perform the methods herein.

The radio network node 12 may comprise a transmitting unit 1002, e.g. a transmitter or a transceiver. The radio network node 12, the processing circuitry 1001 and/or the transmitting unit 1002 is configured to transmit the configuration to the UE comprising one or more conditions when PUSCH or with resources of a configured grant, CG, shall be used to multiplex with UCI, wherein the condition is relating to:

a priority of a CG transmission relative a dynamic PUSCH transmission; a priority of a CG transmission relative other CG transmissions; allowance to carry any UCI in CG resources; presence of MAC PDU for UL transmission; if UCI is scheduled for transmission at a time as PUSCH, the UCI is multiplexed onto the PUSCH; CG size; failure rate of PDCCH; and/or whether dynamically scheduled uplink grant and CG are present.

The radio network node 12 may further be configured to receive one or more UCI multiplexed with a PUSCH or with resources of the CG, and to use a time reference and an additional time.

The radio network node 12 further comprises a memory 1005. The memory comprises one or more units to be used to store data on, such as configurations, time reference, additional time, indications, strengths or qualities, grants, scheduling information, timers, applications to perform the methods disclosed herein when being executed, and similar. Thus, the radio network node 12 may comprise the processing circuitry and the memory, said memory comprising instructions executable by said processing circuitry whereby said radio network node 12 is operative to perform the methods herein. The radio network node 12 comprises a communication interface 1008 comprising transmitter, receiver, transceiver and/or one or more antennas.

The methods according to the embodiments described herein for radio network node 12 are respectively implemented by means of e.g. a computer program product 1006 or a computer program product, comprising instructions, i.e., software code portions, which, when executed on at least one processor, cause the at least one processor to carry out the actions described herein, as performed by the first radio network node 12. The computer program product 1006 may be stored on a computer-readable storage medium 1007, e.g. a USB stick, a disc or similar. The computer-readable storage medium 1007, having stored thereon the computer program product, may comprise the instructions which, when executed on at least one processor, cause the at least one processor to carry out the actions described herein, as performed by the radio network node 12. In some embodiments, the computer-readable storage medium may be a nontransitory or transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multistandard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 6:
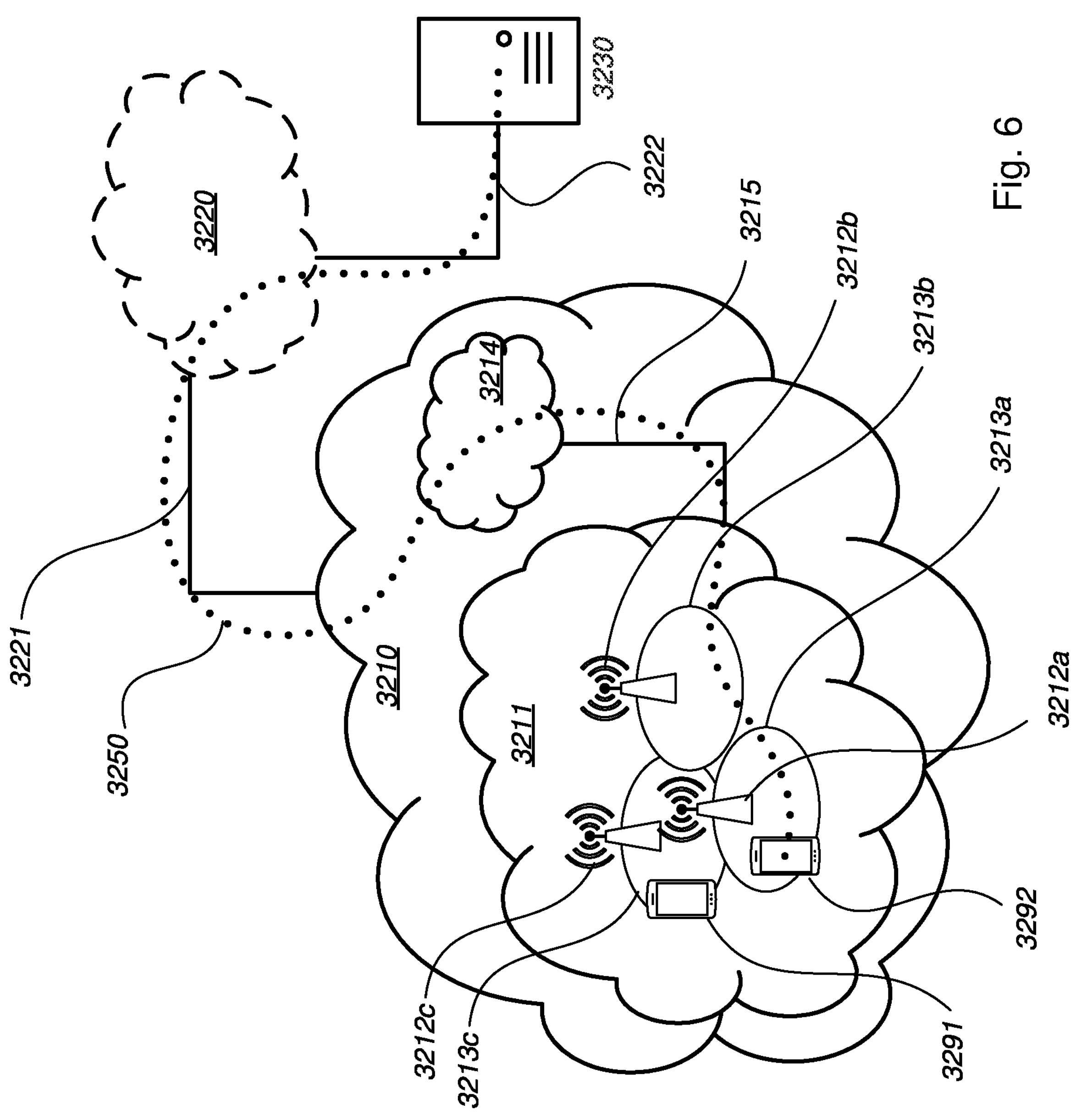
FIG. 6 schematically illustrates a telecommunication network connected via an intermediate network to a host computer.

With reference to FIG. 6, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network node 12 herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the UE 10, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
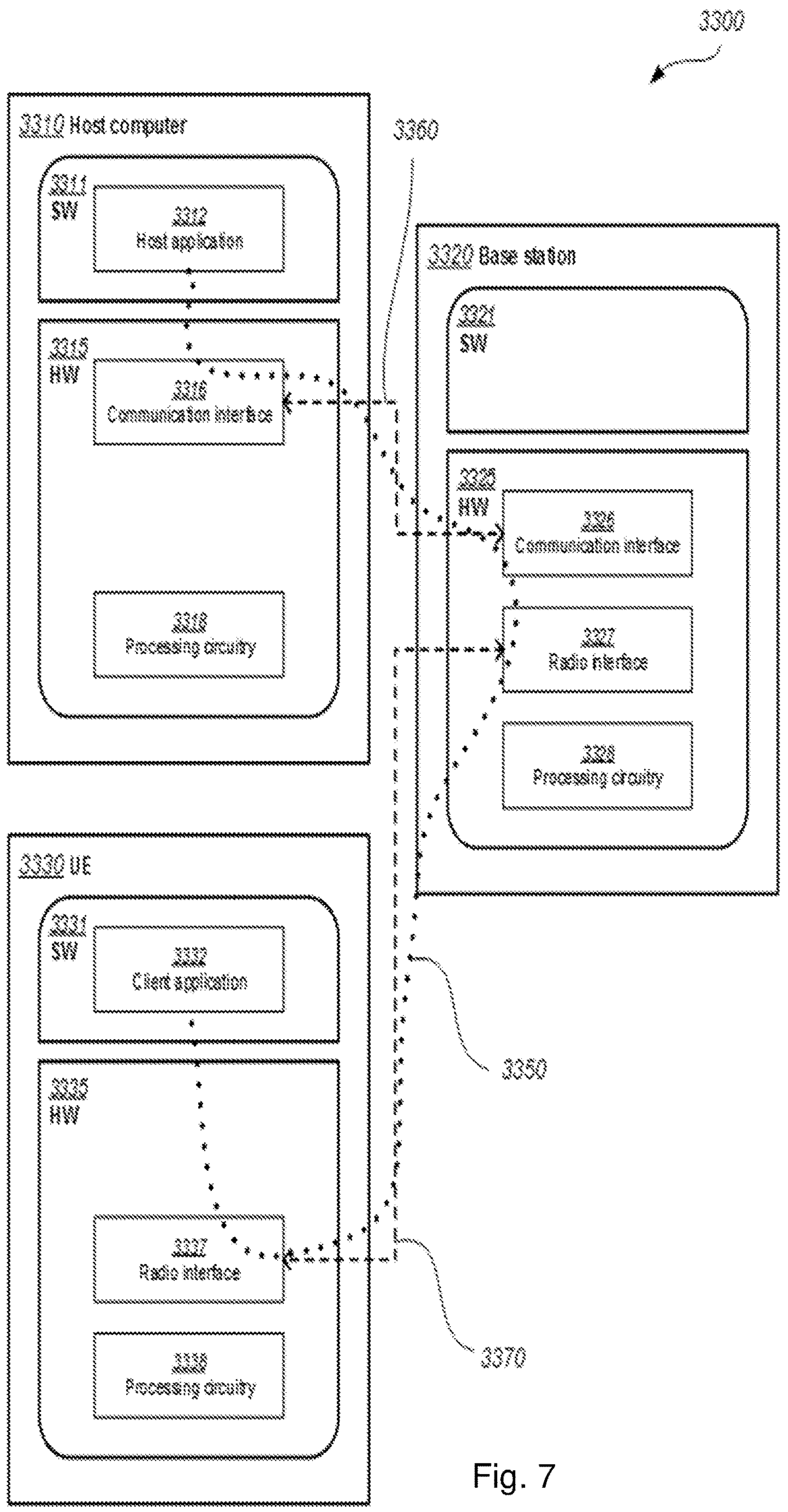
FIG. 7 is a generalized block diagram of a host computer communicating via a base station with a user equipment over a partially wireless connection.

It is noted that the host computer 3310, base station 3320 and UE 3330 illustrated in FIG. 7 may be identical to the host computer 3230, one of the base stations 3212*a*, 3212*b*, 3212*c* and one of the UEs 3291, 3292 of FIG. 6, respectively. This is to say, the inner workings of these entities may be as shown in FIGS. 7 and independently, the surrounding network topology may be that of FIG. 6.

In FIG. 7, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance since UCI is handle more efficiently and may be accurately received and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 8:
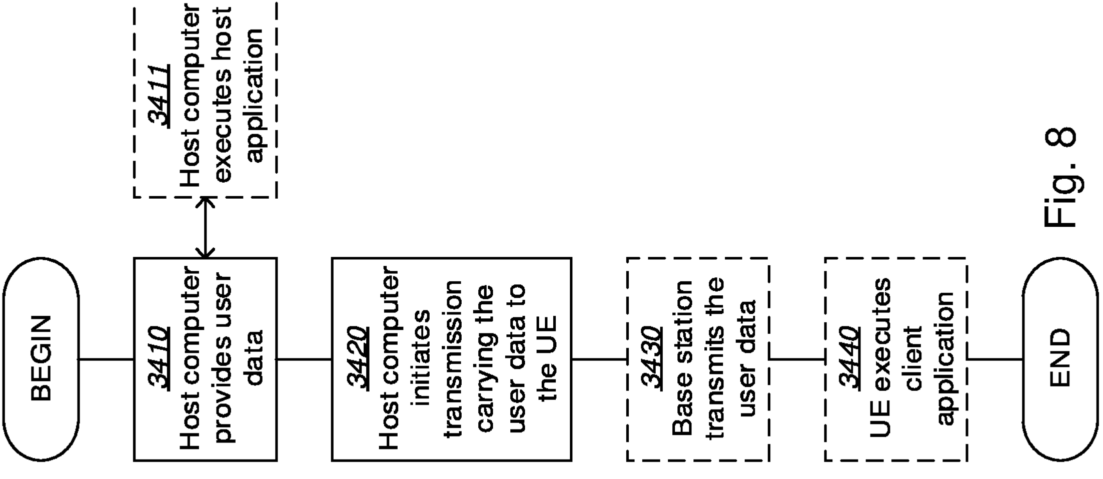

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 9:
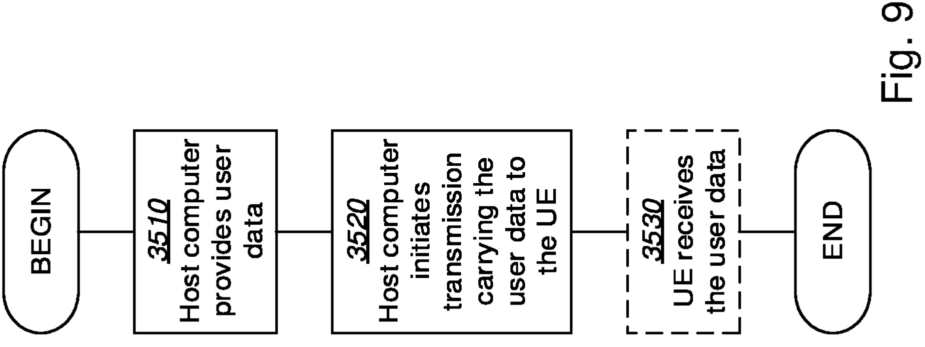
FIGS. 8-11 are flowcharts illustrating methods implemented in a communication system including a host computer, a base station and a user equipment.

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 10:
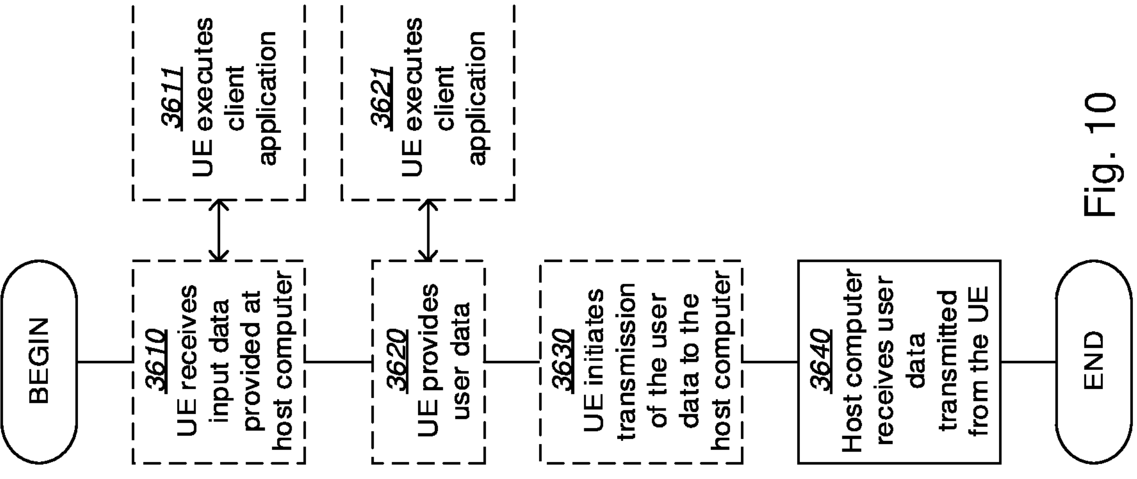

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 11:
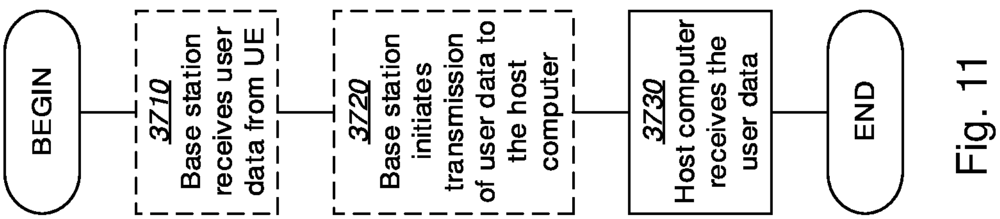

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATIONS

ACK Acknowledged
ADC Analog-to-digital conversion
AGC Automatic gain control
ANR Automatic neighbour relations
AP Access point
BCH Broadcast channel
BLER Block error rate
BRS Beam Reference Signal
BS Base station
BSC Base station controller
BTS Base transceiver station
CA Carrier aggregation
CC Component carrier
CG Cell group
CGI Cell global identity
CP Cyclic prefix
CPICH Common pilot channel
CQI Channel Quality Indicator
CSG Closed subscriber group
CSI-RS Channel State Information Reference Signal
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
ID Identity
M2M machine to machine
MAC Media access control
MCG Master cell group
MDT Minimization of drive tests
MeNB Master eNode B
MIB Master information block
MME Mobility management entity
MRS Mobility Reference Signal
MRTD Maximum receive timing difference
MSR Multi-standard radio
NACK Not acknowledged
OFDM Orthogonal frequency-division multiplexing
RI Rank Indicator
SI System Information
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PMI Precoding Matrix Indicator
PSCell Primary SCell
PSC Primary serving cell
PSS Primary synchronization signal
RAT Radio access Technology
RF Radio frequency
RLM Radio link monitoring
RNC Radio network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
RV Redundancy version
Rx Receiver
SCC Secondary component carrier
SCell Secondary Cell
SCG Secondary Cell Group
SeNB Secondary eNode B
SFN System frame number
SGW Signalling gateway
SI System information
SIB System information block
SIB1 System information block type 1
SINR Signal to interference and noise ratio
SON Self-organizing networks
SSC Secondary serving cell
SSS Secondary synchronization signal
TA Timing advance
TDD Time division duplex
Tx Transmitter
UARFCN UMTS Absolute Radio Frequency Channel Number
UE User equipment
UL Uplink

The invention claimed is:

1. A method performed by user equipment, UE, for handling communication in a wireless communication network, a physical uplink control channel, PUCCH, overlapping one or more physical uplink shared channels, PUSCH, on one or multiple carriers with at least one symbol, the method comprising:

multiplexing uplink control information, UCI, with a PUSCH or with resources of a configured grant, CG, using a time reference and an additional time for the multiplexing with the CG, the time reference being a time when the UE sends confirmation in a media access control (MAC) control element (CE) to acknowledge receiving of a valid physical downlink control channel (PDCCH) carrying activation or deactivation of the CG, or a time when an activating or deactivating downlink control information (DCI) for the CG is received at the UE, the additional time being a PUSCH retransmission time, and the multiplexing with the CG based on whether or not a condition from one or more conditions has been fulfilled as follows based on one or more of:

if a CG transmission has a higher priority relative to a dynamic PUSCH transmission, the CG transmission is prioritized over the dynamic PUSCH transmission;

if a CG transmission has a higher priority relative to other CG transmissions over same or multiple CCs to carry the UCI, the UCI is multiplexed onto the CG with the higher priority;

if a CG is configured to not carry any UCI, the CG is excluded from a procedure to carry a UCI;

if a MAC protocol data unit, PDU, for uplink, UL, transmission has been delivered for a CG transmission that is one or both of skipped and de-prioritized, the CG is autonomously retransmitted in a next CG occasion;

if UCI is scheduled for transmission at a time as PUSCH, the UCI is multiplexed onto the PUSCH;

if a size of a CG does not allow the CG to carry a UCI, the CG is skipped or assigned a lower resolution priority;

if a PDCCH has a high failure rate indicating that the PUSCH is unreliable, the UCI is multiplexed onto the CG;

if a dynamically scheduled uplink grant is present, surviving grants are considered mandatory surviving grants by default; and if a CG is present, surviving grants are considered optional surviving grants by default; and transmitting the UCI multiplexed onto the PUSCH or with the resources of the CG to a radio network node.

2. The method according to claim 1, wherein multiplexing the one or more UCI with the PUSCH or with resources of the CG, uses a timeline relating to transmission of confirmation or receiving of indication of deactivating or activating relating to CG transmission.

3. The method according to claim 1, further comprising receiving a configuration from the radio network node comprising the one or more conditions.

4. The method according to claim 2, further comprising receiving a configuration from the radio network node comprising the one or more conditions.

5. A method performed by a radio network node for handling communication of a user equipment, UE, in a wireless communication network, the method comprising:

transmitting a configuration to the UE comprising one or more conditions when a physical uplink shared channel, PUSCH, or resources of a configured grant, CG, are to be used to multiplex with uplink control information, UCI, using a time reference and an additional time for the multiplexing with the CG, the time reference being a time when the UE sends confirmation in a media access control (MAC) control element (CE) to acknowledge receiving of a valid physical downlink control channel (PDCCH) carrying activation or deactivation of the CG, or a time when an activating or deactivating downlink control information (DCI) for the CG is received at the UE, the additional time being a PUSCH retransmission time, and the one or more conditions being one or more of the following:

if a CG transmission has a higher priority relative to a dynamic PUSCH transmission, the CG transmission is prioritized over the dynamic PUSCH transmission;

if a CG transmission has a higher priority relative to other CG transmissions over same or multiple CCs to carry the UCI, the UCI is multiplexed onto the CG with the higher priority;

if a CG is configured to not carry any UCI, the CG is excluded from a procedure to carry a UCI;

if a MAC protocol data unit, PDU, for uplink, UL, transmission has been delivered for a CG transmission that is one or both of skipped and de-prioritized, the CG is autonomously retransmitted in a next CG occasion;

if UCI is scheduled for transmission at a time as PUSCH, the UCI is multiplexed onto the PUSCH;

if a size of a CG does not allow the CG to carry a UCI, the CG is skipped or assigned a lower resolution priority;

if a PDCCH has a high failure rate indicating that the PUSCH is unreliable, the UCI is multiplexed onto the CG;

if a dynamically scheduled uplink grant is present, surviving grants are considered mandatory surviving grants by default; and if a CG is present, surviving grants are considered optional surviving grants by default.

6. The method according to claim 5, further comprising receiving one or more UCI multiplexed with a PUSCH or with resources of the CG, and using a time reference and an additional time.

7. A user equipment, UE, for handling communication in a wireless communication network, a physical uplink control channel, PUCCH, overlapping one or more physical uplink shared channels, PUSCH, on one or multiple carriers with at least one symbol, the UE comprising a processor and a memory and being configured to:

multiplex one or more uplink control information, UCI, with a PUSCH or with resources of a configured grant, CG, using a time reference and an additional time for the multiplexing with the CG, the time reference being a time when the UE sends confirmation in a media access control (MAC) control element (CE) to acknowledge receiving of a valid physical downlink control channel (PDCCH) carrying activation or deactivation of the CG, or a time when an activating or deactivating downlink control information (DCI) for the CG is received at the UE, the additional time being a PUSCH retransmission time, and the multiplexing with the CG based on whether a condition from one or more conditions has been fulfilled or not, as follows based on one or more of:

if a CG transmission has a higher priority relative to a dynamic PUSCH transmission, the CG transmission is prioritized over the dynamic PUSCH transmission;

if a CG transmission has a higher priority relative to other CG transmissions over same or multiple CCs to carry the UCI, the UCI is multiplexed onto the CG with the higher priority;

if a CG is configured to not carry any UCI, the CG is excluded from a procedure to carry a UCI;

if a MAC protocol data unit, PDU, for uplink, UL, transmission has been delivered for a CG transmission that is one or both of skipped and de-prioritized, the CG is autonomously retransmitted in a next CG occasion;

if UCI is scheduled for transmission at a time as PUSCH, the UCI is multiplexed onto the PUSCH;

if a size of a CG does not allow the CG to carry a UCI, the CG is skipped or assigned a lower resolution priority;

if a PDCCH has a high failure rate indicating that the PUSCH is unreliable, the UCI is multiplexed onto the CG;

if a dynamically scheduled uplink grant is present, surviving grants are considered mandatory surviving grants by default; and if a CG is present, surviving grants are considered optional surviving grants by default; and transmit the UCI multiplexed onto the PUSCH or with the resources of the CG to a radio network node.

8. The UE according to claim 7, wherein the UE is configured to multiplex the one or more UCI with the PUSCH or with resources of the CG, by using a timeline relating to transmission of confirmation or receiving of indication of deactivating or activating relating to CG transmission.

9. The UE according to claim 7, wherein the UE is configured to receive a configuration from the radio network node comprising the one or more conditions.

10. The UE according to claim 8, wherein the UE is configured to receive a configuration from the radio network node comprising the one or more conditions.

11. A radio network node for handling communication of a user equipment, UE, in a wireless communication network, the radio network node comprising a processor and a memory and being configured to:

transmit a configuration to the UE comprising one or more conditions when physical uplink shared channel, PUSCH, or resources of a configured grant, CG, are to be used to multiplex with uplink control information, UCI, using a time reference and an additional time for the multiplexing with the CG, the time reference being a time when the UE sends confirmation in a media access control (MAC) control element (CE) to acknowledge receiving of a valid physical downlink control channel (PDCCH) carrying activation or deactivation of the CG, or a time when an activating or deactivating downlink control information (DCI) for the CG is received at the UE, the additional time being a PUSCH retransmission time, and the one or more conditions being one or more of the following:

if a CG transmission has a higher priority relative to a dynamic PUSCH transmission, the CG transmission is prioritized over the dynamic PUSCH transmission;

if a CG transmission has a higher priority relative to other CG transmissions over same or multiple CCs to carry the UCI, the UCI is multiplexed onto the CG with the higher priority;

if a CG is configured to not carry any UCI, the CG is excluded from a procedure to carry a UCI;

if a MAC protocol data unit, PDU, for uplink, UL, transmission has been delivered for a CG transmission that is one or both of skipped and de-prioritized, the CG is autonomously retransmitted in a next CG occasion;

if UCI is scheduled for transmission at a time as PUSCH, the UCI is multiplexed onto the PUSCH;

if a size of a CG does not allow the CG to carry a UCI, the CG is skipped or assigned a lower resolution priority;

if a PDCCH has a high failure rate indicating that the PUSCH is unreliable, the UCI is multiplexed onto the CG;

if a dynamically scheduled uplink grant is present, surviving grants are considered mandatory surviving grants by default; and if a CG is present, surviving grants are considered optional surviving grants by default.

12. A non-transitory computer-readable storage medium, having stored thereon a computer program comprising instructions which, when executed on at least one processor, cause the at least one processor to carry out a method for handling communication in a wireless communication network, a physical uplink control channel, PUCCH, overlapping one or more physical uplink shared channels, PUSCH, on one or multiple carriers with at least one symbol, the method comprising:

multiplexing uplink control information, UCI, with a PUSCH or with resources of a configured grant, CG, using a time reference and an additional time for the multiplexing with the CG, the time reference being a time when the UE sends confirmation in a media access control (MAC) control element (CE) to acknowledge receiving of a valid physical downlink control channel (PDCCH) carrying activation or deactivation of the CG, or a time when an activating or deactivating downlink control information (DCI) for the CG is received at the UE, the additional time being a PUSCH retransmission time, and the multiplexing with the CG based on whether or not a condition from one or more conditions has been fulfilled as follows based on one or more of:

if a CG transmission has a higher priority relative to a dynamic PUSCH transmission, the CG transmission is prioritized over the dynamic PUSCH transmission;

if a CG transmission has a higher priority relative to other CG transmissions over same or multiple CCs to carry the UCI, the UCI is multiplexed onto the CG with the higher priority;

if a CG is configured to not carry any UCI, the CG is excluded from a procedure to carry a UCI;

if a MAC protocol data unit, PDU, for uplink, UL, transmission has been delivered for a CG transmission that is one or both of skipped and de-prioritized, the CG is autonomously retransmitted in a next CG occasion;

if UCI is scheduled for transmission at a time as PUSCH, the UCI is multiplexed onto the PUSCH;

if a size of a CG does not allow the CG to carry a UCI, the CG is skipped or assigned a lower resolution priority;

if a PDCCH has a high failure rate indicating that the PUSCH is unreliable, the UCI is multiplexed onto the CG;

if a dynamically scheduled uplink grant is present, surviving grants are considered mandatory surviving grants by default; and if a CG is present, surviving grants are considered optional surviving grants by default; and transmitting the UCI multiplexed onto the PUSCH or with the resources of the CG to a radio network node.

* * * * *